(12) United States Patent
Jefferson

(10) Patent No.: US 11,142,370 B2
(45) Date of Patent: Oct. 12, 2021

(54) INTERLOCKING PALLET WITH WHEELS AND BRAKING SYSTEM

(71) Applicant: Sheldon Lamar Jefferson, Las Vegas, NV (US)

(72) Inventor: Sheldon Lamar Jefferson, Las Vegas, NV (US)

( * ) Notice: Subject to any disclaimer, the term of this patent is extended or adjusted under 35 U.S.C. 154(b) by 0 days.

(21) Appl. No.: 15/888,651

(22) Filed: Feb. 5, 2018

(65) Prior Publication Data
US 2019/0300235 A1  Oct. 3, 2019

Related U.S. Application Data

(60) Provisional application No. 62/499,746, filed on Feb. 6, 2017.

(51) Int. Cl.
*B65D 19/42* (2006.01)
*B65D 19/44* (2006.01)
*B60B 33/00* (2006.01)

(52) U.S. Cl.
CPC .......... *B65D 19/42* (2013.01); *B60B 33/0086* (2013.01); *B65D 19/44* (2013.01); *B60B 33/0042* (2013.01); *B65D 2519/00746* (2013.01); *B65D 2519/00781* (2013.01); *B65D 2519/00796* (2013.01); *B65D 2519/00815* (2013.01)

(58) Field of Classification Search
CPC ........ B65D 19/00; B65D 19/44; B65D 19/42; B65D 2519/00746; B65D 2519/00781; B65D 2519/00796; B65D 2519/00815; B60B 33/0086

USPC .................. 108/51.11, 54.1, 55.1, 53.3, 56.1
See application file for complete search history.

(56) References Cited

U.S. PATENT DOCUMENTS

| | | | | | |
|---|---|---|---|---|---|
| 2,386,516 | A | * | 10/1945 | Thompson | B60B 29/002 254/8 C |
| 2,572,348 | A | * | 10/1951 | Johnson | B65D 19/42 280/43.24 |
| 2,841,302 | A | * | 7/1958 | Reisman | B66F 9/18 414/608 |
| 2,947,565 | A | * | 8/1960 | Wood | B62B 3/02 296/3 |
| 2,949,863 | A | * | 8/1960 | Cozzoli | B60P 7/13 104/135 |
| 3,506,138 | A | * | 4/1970 | Travis | A47B 47/03 108/91 |
| 4,095,769 | A | * | 6/1978 | Fengels | B65D 19/0002 108/54.1 |

(Continued)

*Primary Examiner* — Jose V Chen

(57) ABSTRACT

A pallet with wheels and braking system, that can be interlocked with other pallets. The pallet has wheels underneath that allow the pallet to move in all directions. The pallet's braking system slows and stops the wheels on the pallet. There is interlocking connection capabilities on all four sides of the pallet that interlocks and connects multiple pallets together, and synchronizes the interlocked pallet's braking systems. There is also forklift access on all four sides of the pallet that allows the forklift to push, pull or lift the pallet, and operate the pallet's braking and interlocking systems. The pallet further includes corner bumpers to protect pallet, load stabilizers that prevent pallet from moving during transit, shelf rack bars that are installed or extended for additional support of goods and shelving, and wheel insets that prevent wheels from moving when pallets are stacked.

9 Claims, 15 Drawing Sheets

(56) References Cited

U.S. PATENT DOCUMENTS

| | | | | |
|---|---|---|---|---|
| 4,347,794 A * | 9/1982 | Nordstrom | B65D 19/38 | 108/57.15 |
| 4,921,264 A * | 5/1990 | Duffy | B62B 5/0083 | 108/55.3 |
| 5,007,352 A * | 4/1991 | Calkoen | B65D 19/0059 | 108/56.1 |
| 5,105,746 A * | 4/1992 | Reynolds | B65D 19/0012 | 108/54.1 |
| 5,860,369 A * | 1/1999 | John | B65D 19/0075 | 108/56.1 |
| 6,257,152 B1 * | 7/2001 | Liu | B62B 3/16 | 108/53.3 |
| 6,974,140 B2 * | 12/2005 | Neuman | B62B 3/02 | 280/79.11 |
| 6,979,005 B1 * | 12/2005 | McLerran | B62B 3/00 | 108/53.1 |
| 7,313,898 B1 * | 1/2008 | Eller | B65B 21/06 | 108/153.1 |
| 8,438,980 B2 * | 5/2013 | Pichereau | B65D 19/0016 | 108/56.1 |
| 8,505,469 B2 * | 8/2013 | Liu | B65D 19/44 | 108/56.3 |
| 8,943,980 B2 * | 2/2015 | Moberg | B65D 19/0048 | 108/57.15 |
| 9,422,083 B1 * | 8/2016 | Embleton | B65D 19/38 | |
| 10,092,098 B2 * | 10/2018 | Jackson | F16M 13/02 | |
| 10,293,974 B1 * | 5/2019 | Scheer | B65D 19/38 | |
| 2005/0252423 A1 * | 11/2005 | Baker | B65D 88/129 | 108/55.1 |
| 2007/0012224 A1 * | 1/2007 | Aulanko | B66B 23/10 | 108/57.15 |
| 2007/0186827 A1 * | 8/2007 | Loftus | B65D 19/0016 | 108/57.15 |
| 2008/0250986 A1 * | 10/2008 | Boon | B65D 88/005 | 108/53.1 |
| 2009/0090281 A1 * | 4/2009 | Huettner | B65D 19/0097 | 108/55.3 |
| 2010/0059951 A1 * | 3/2010 | Hadar | B62B 3/02 | 280/79.3 |
| 2013/0119623 A1 * | 5/2013 | Sadeh | B65D 19/0026 | 280/30 |
| 2013/0121800 A1 * | 5/2013 | Hacko | B65D 19/0026 | 414/800 |
| 2017/0253283 A1 * | 9/2017 | Eidelson | B62D 51/001 | |
| 2019/0031222 A1 * | 1/2019 | Takyar | B65D 19/0095 | |
| 2019/0031394 A1 * | 1/2019 | Millhouse | B65D 19/42 | |

* cited by examiner

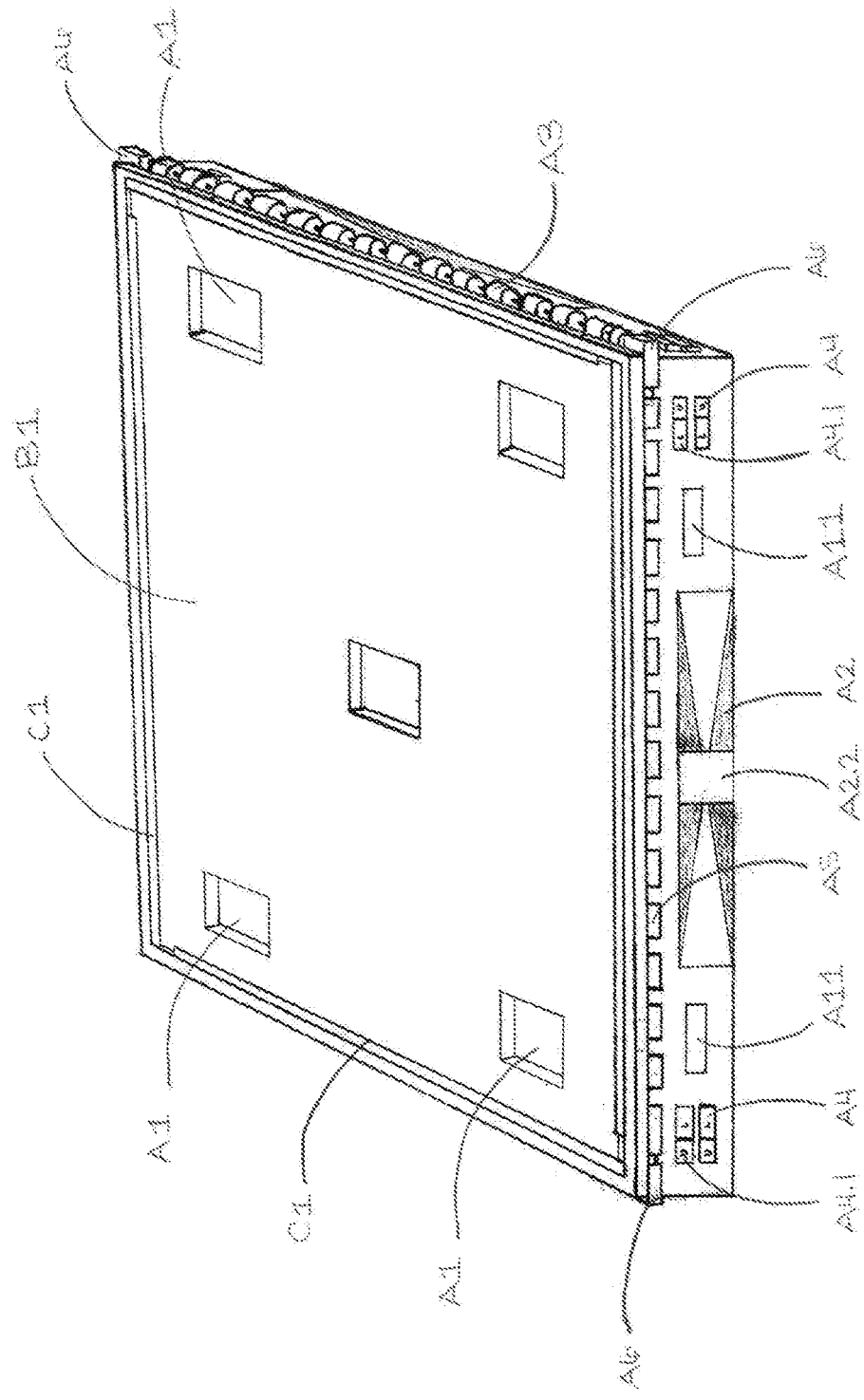

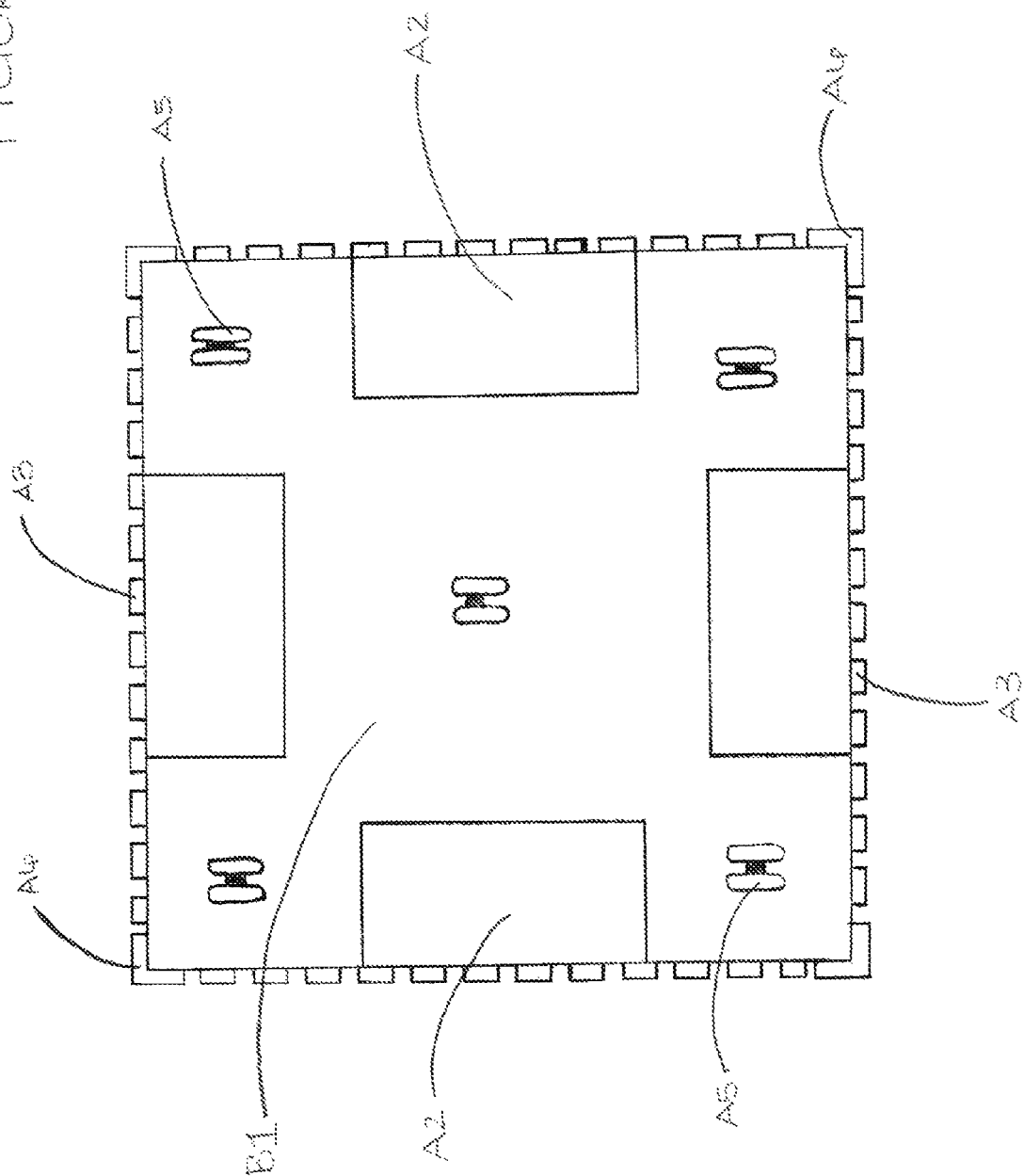

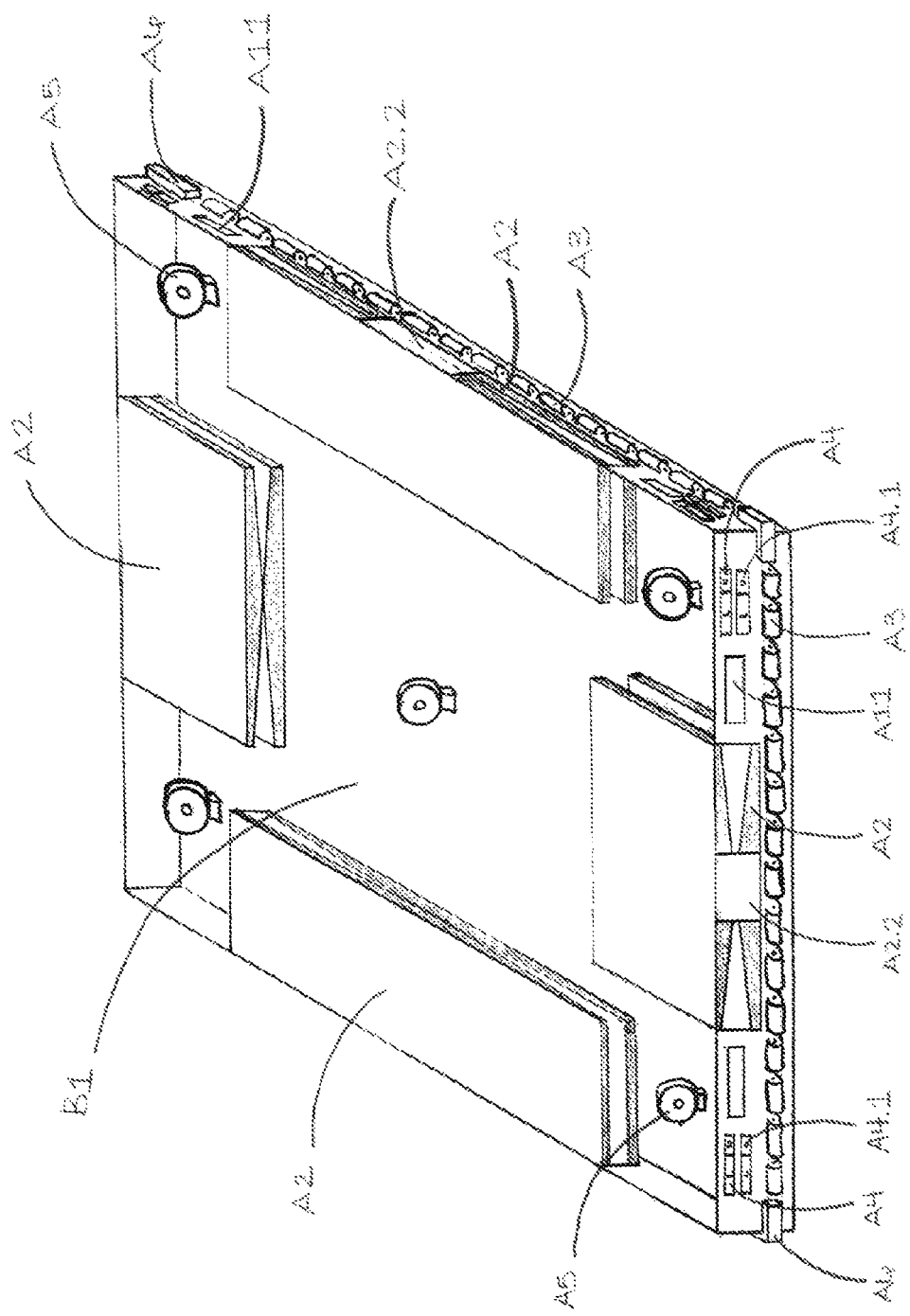

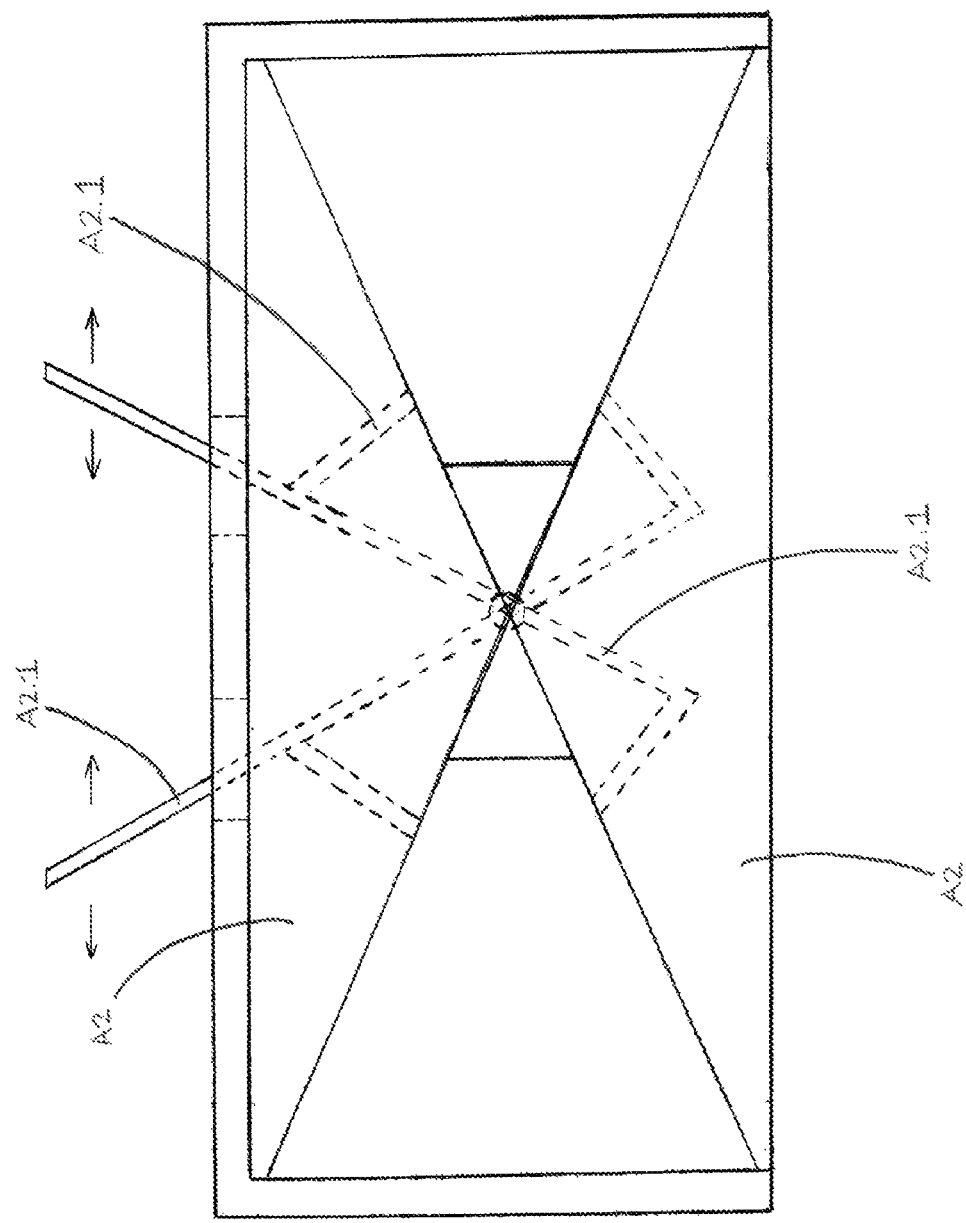

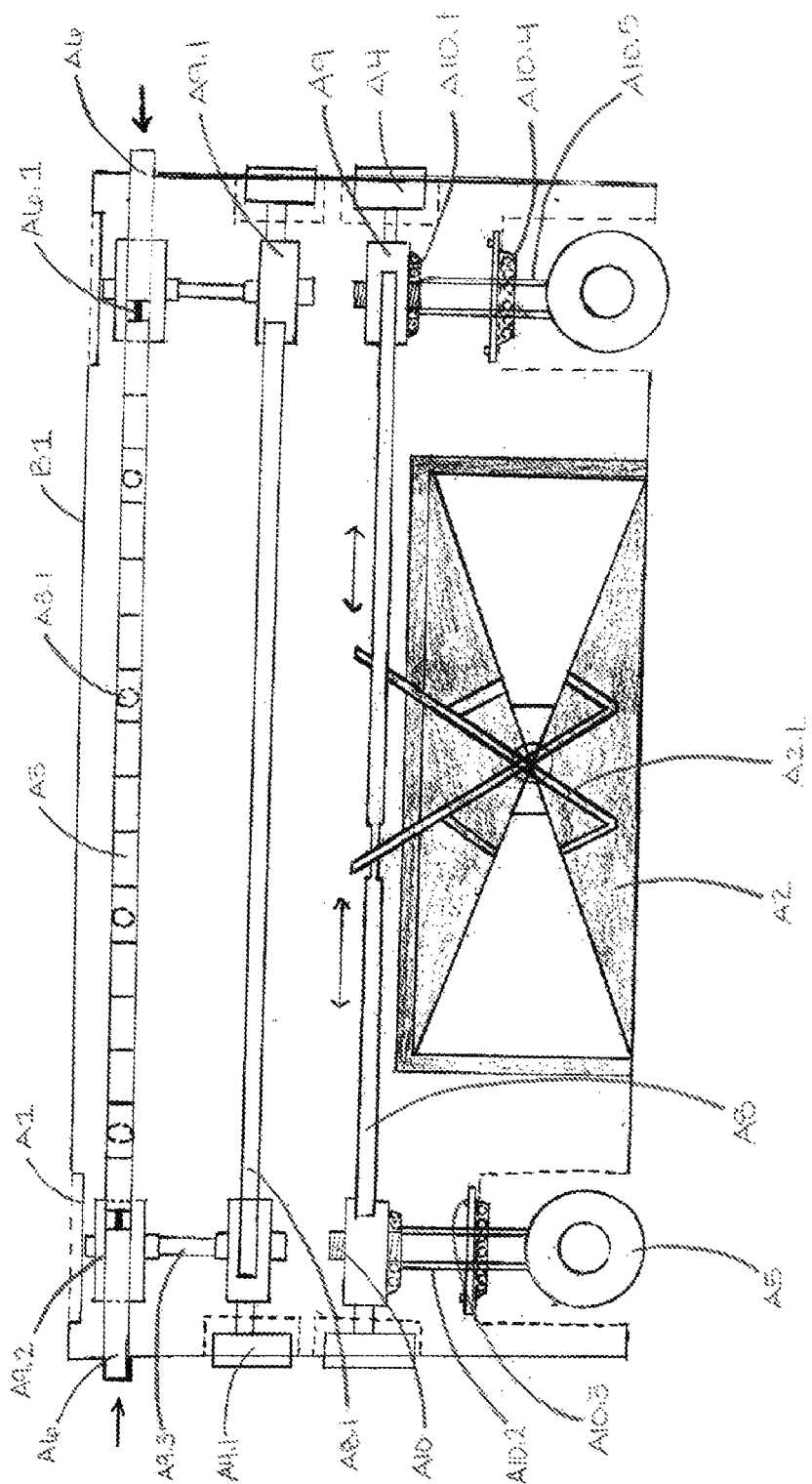

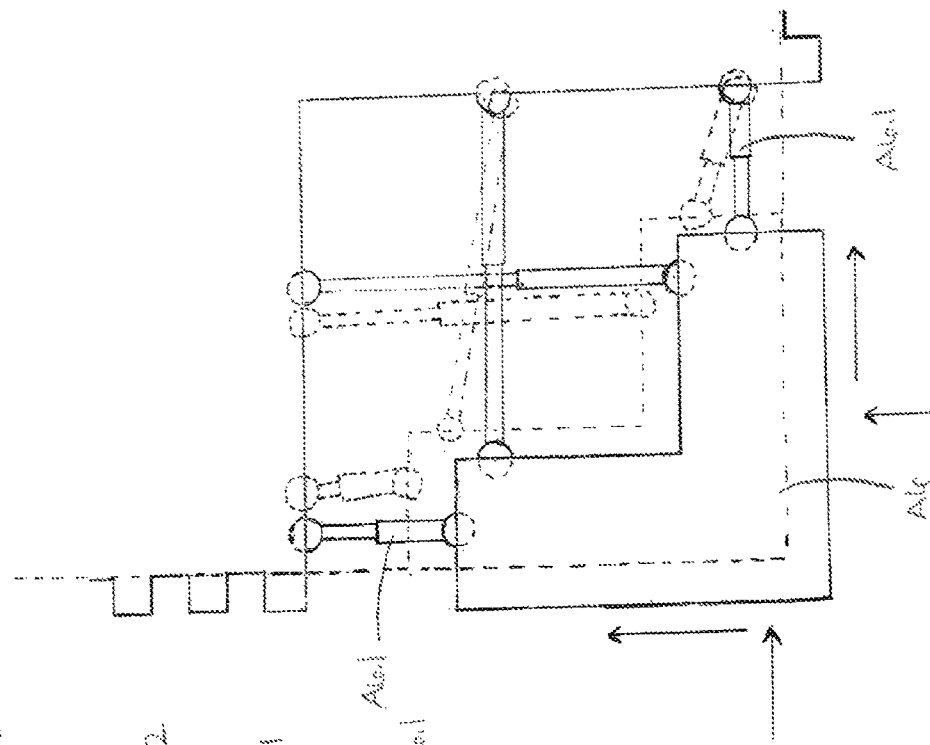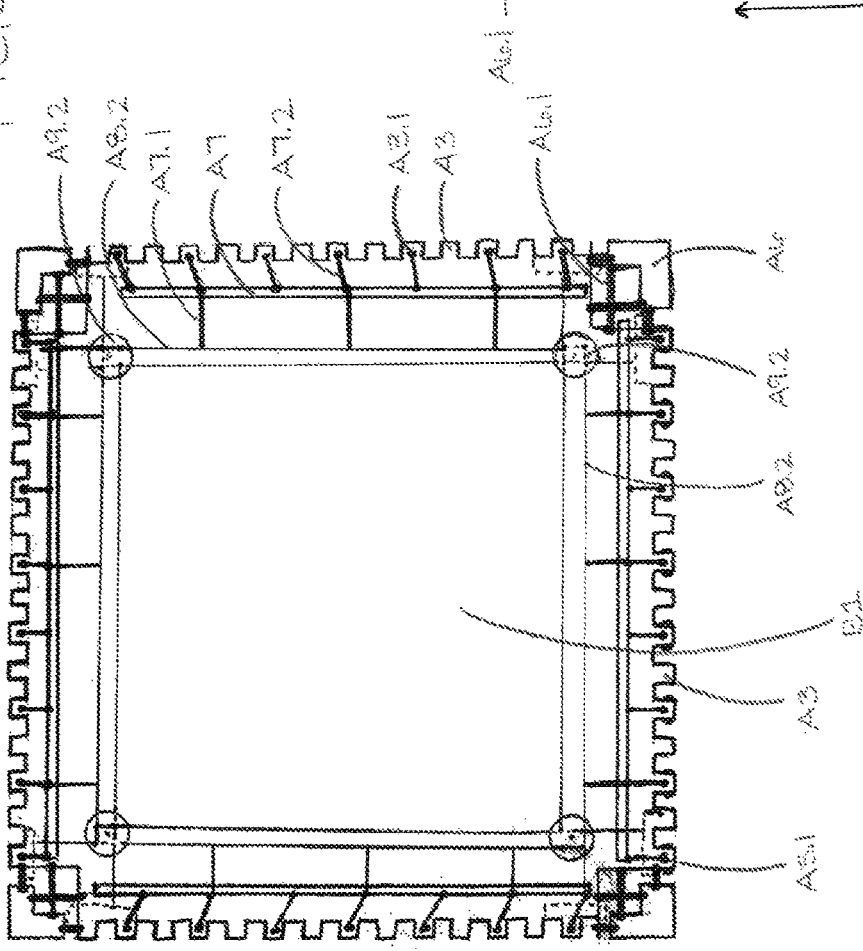

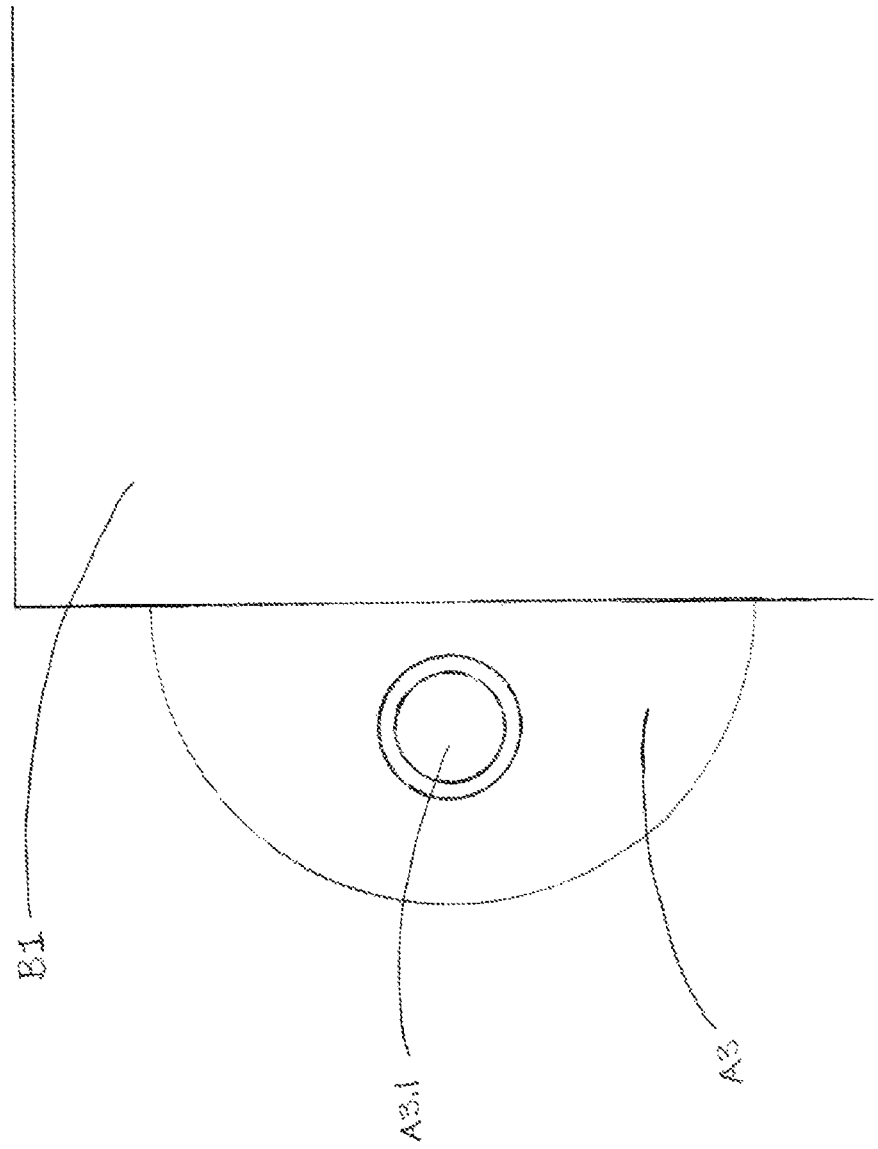

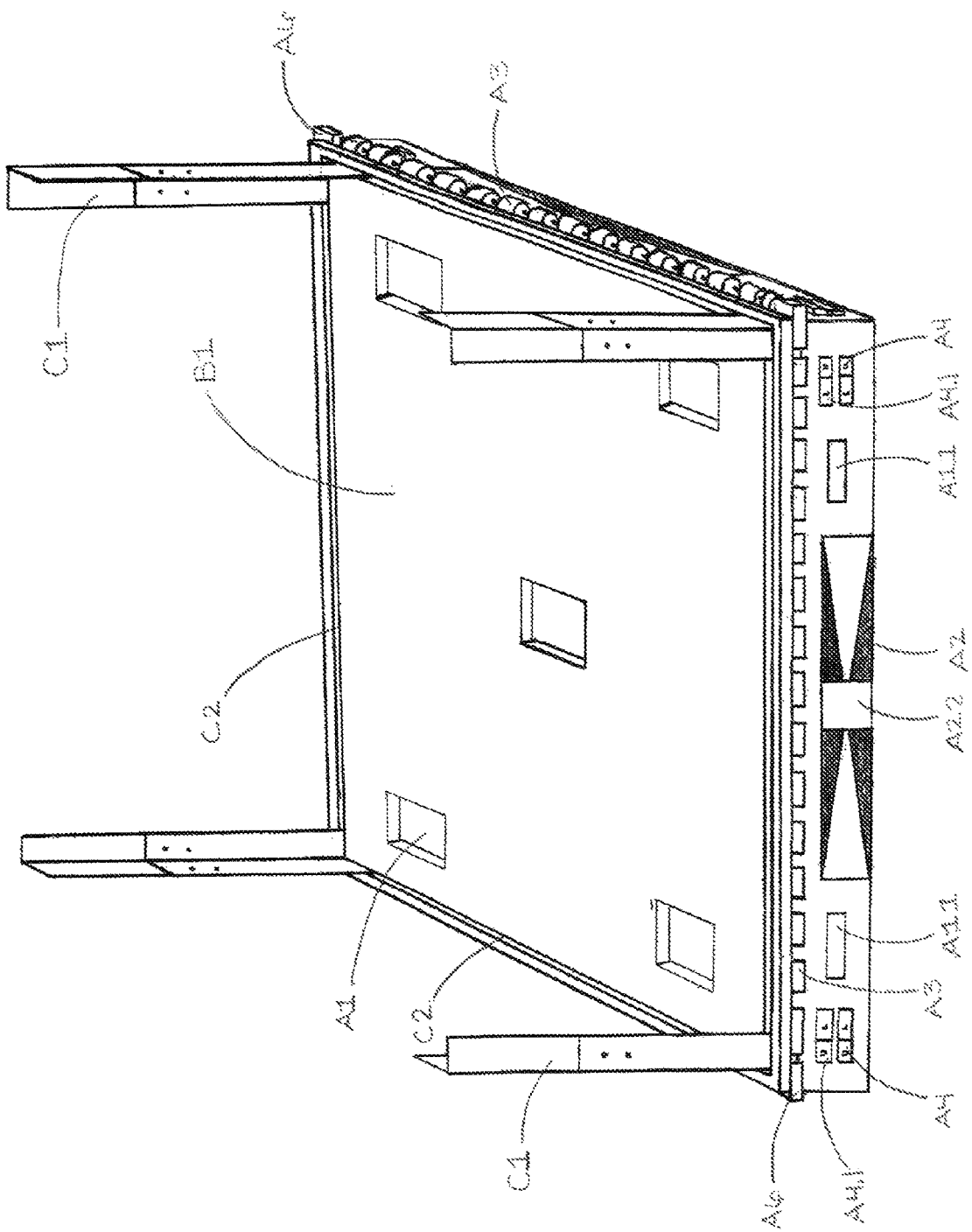

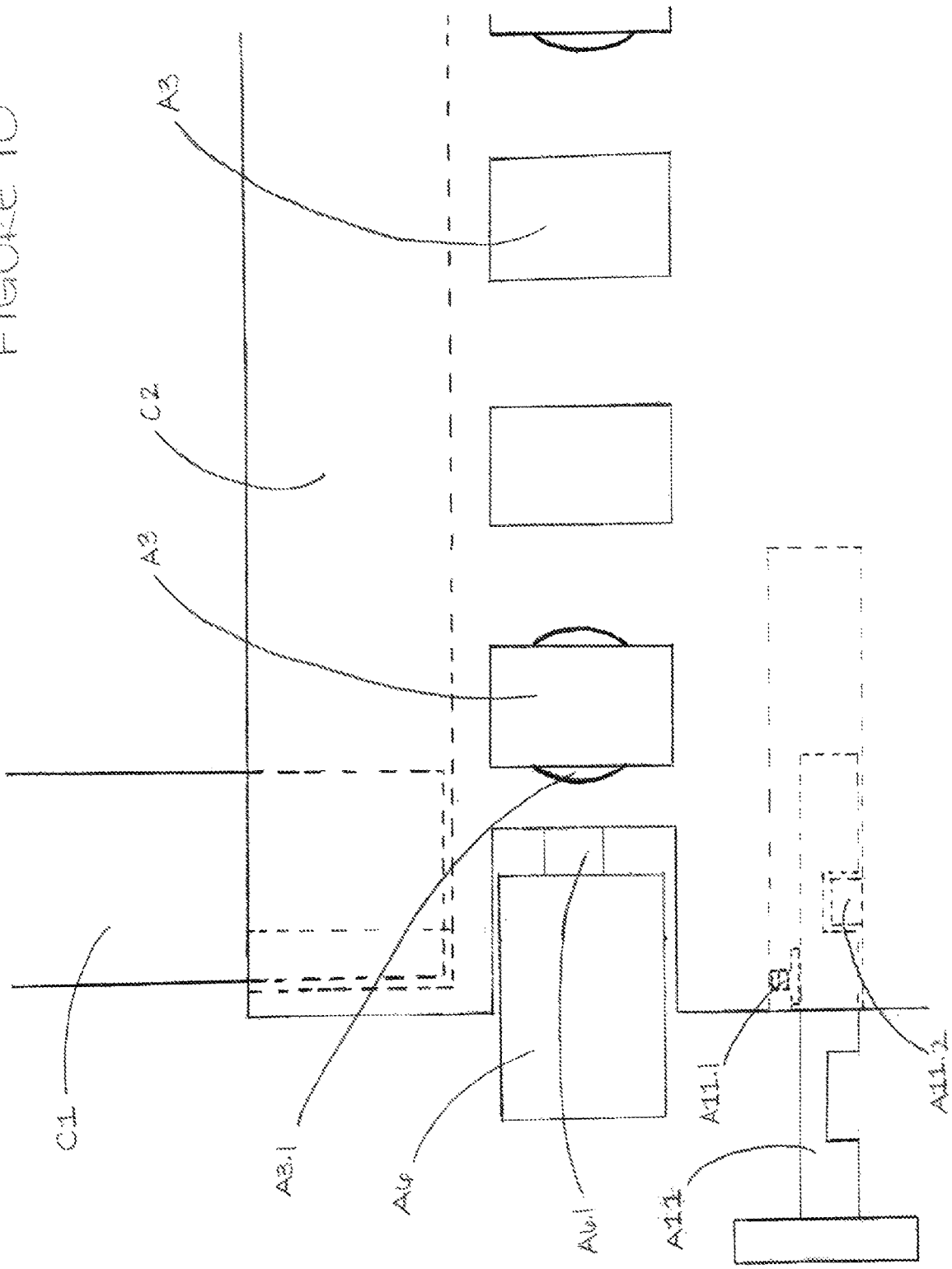

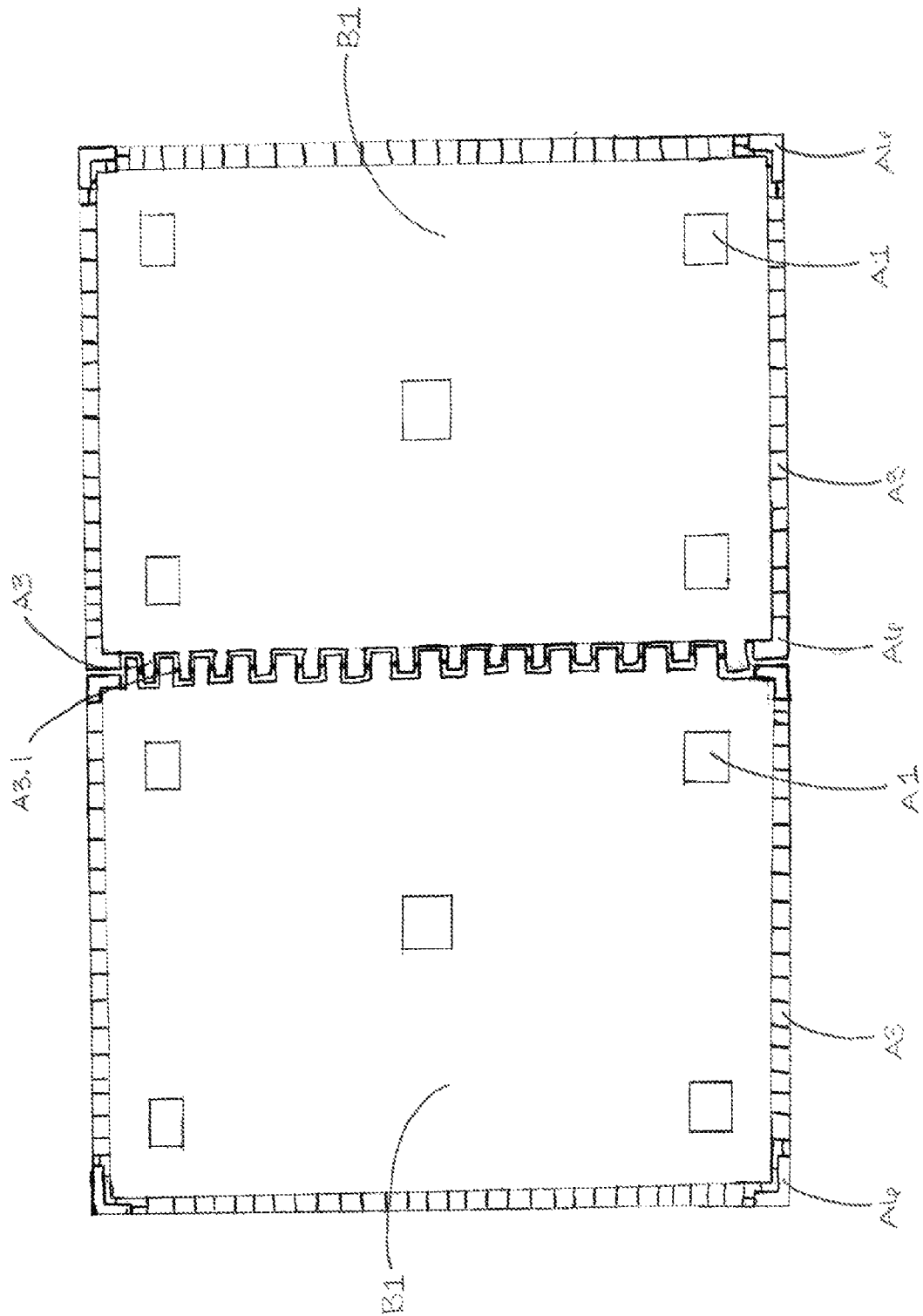

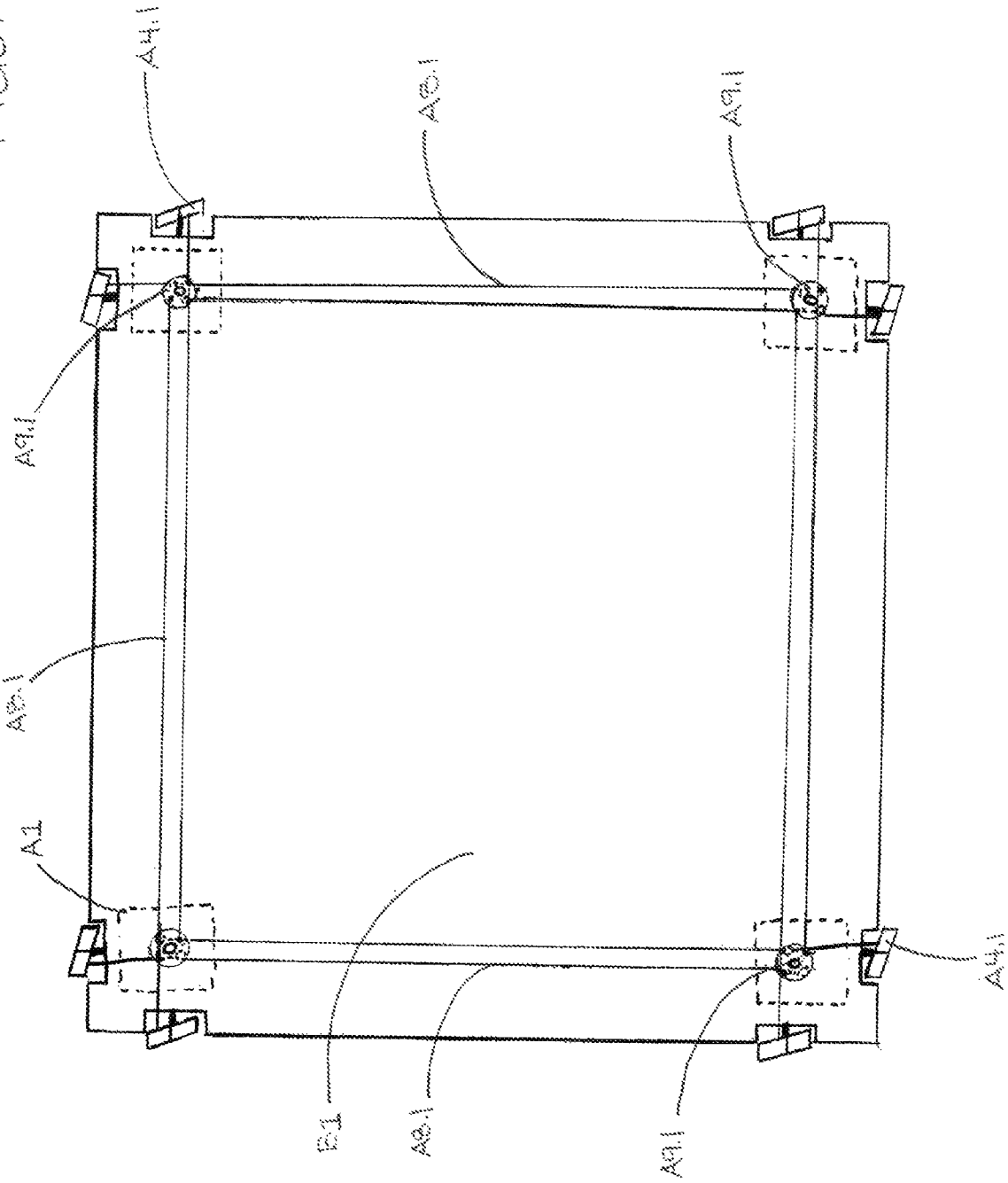

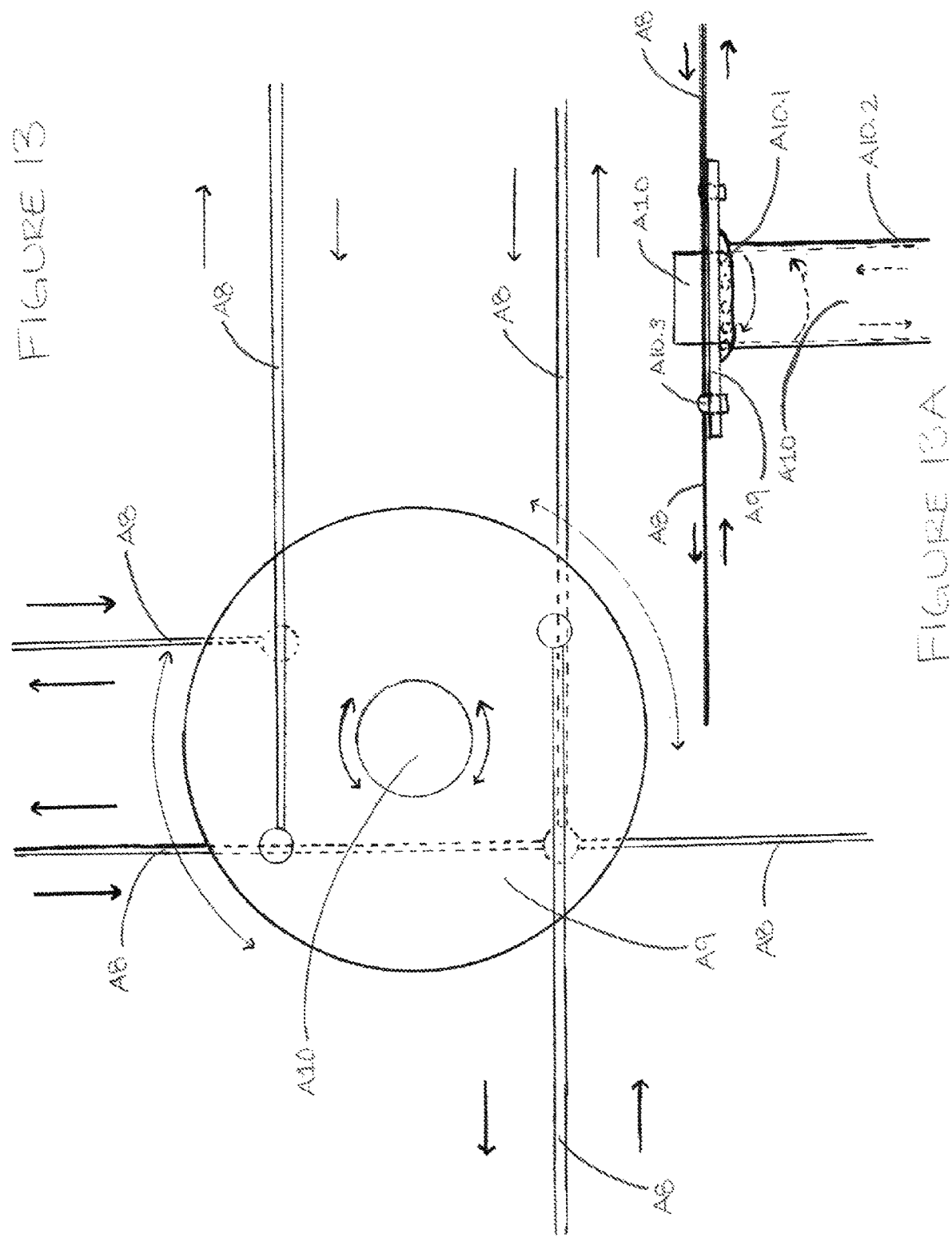

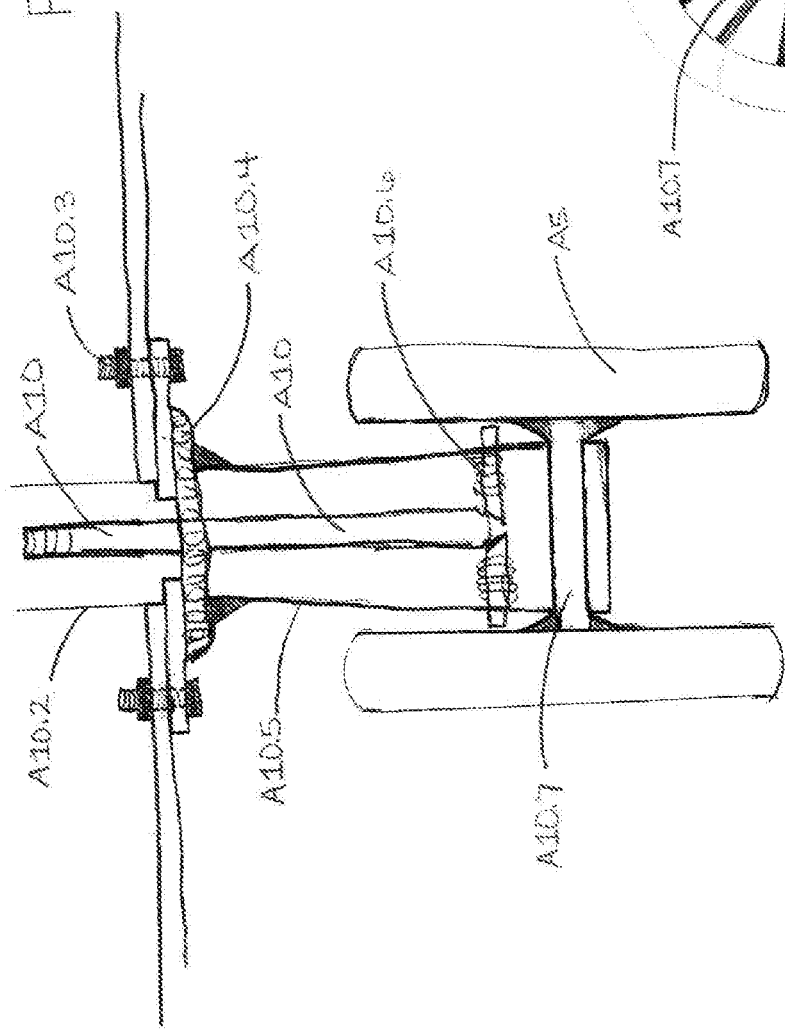
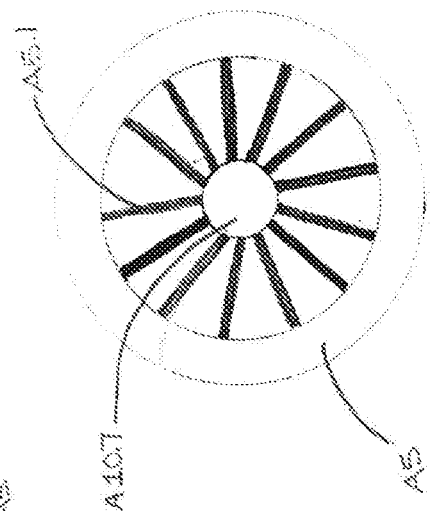

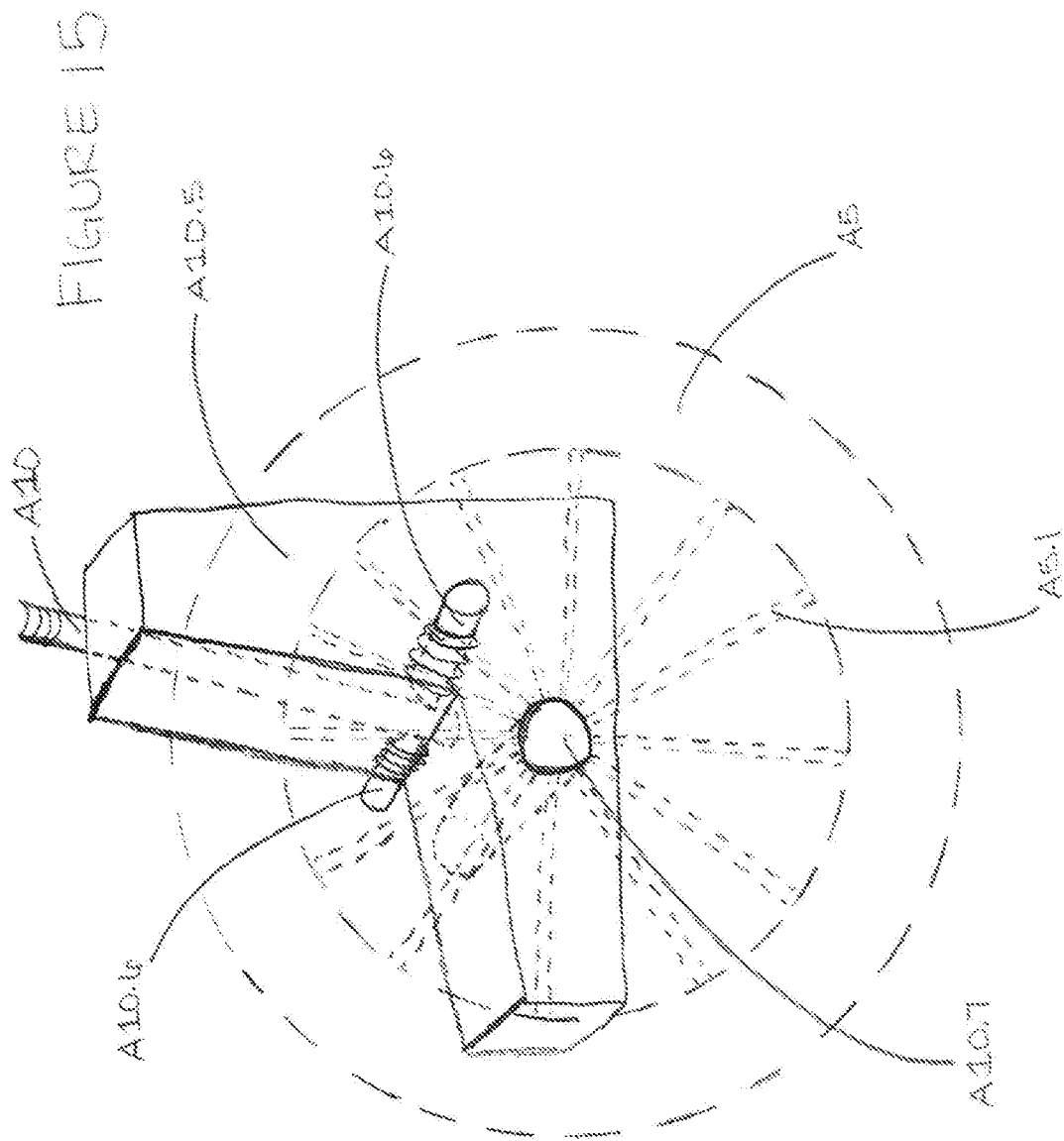

INTERLOCKING PALLET WITH WHEELS AND BRAKING SYSTEM

BACKGROUND OF THE INVENTION

A pallet provides a structural foundation of a unit load and combined goods, allowing for shipping, handling, and storage efficiencies. Pallets are made out of wood, plastic, metal, and recycled materials. They are reusable and are square in shape, with various sizes and configurations. Most pallets can carry a load of 2,000 pounds or more.

Fulfillment centers, distribution centers, warehouses, storage facilities, shipment preparation centers, processing facilities and other like facilities are purposed for receiving, storing and distributing items and goods. These items and goods are packed onto pallets preparing to be shipped and transported to their desired destination. Pallets are transported with shipping vehicles including trucks, vans, trailers, aircraft, ships, railway cars and other like terms. Loaded pallets can only be lifted one by one with fork lifts, pallet jacks, front loaders and other lifting machinery.

Wood remains to be the most common pallet material used in the United States. Wooden pallets have a major environmental impact and only has a lifespan of 3 to 5 years. Upwards of 450 million wooden pallets are manufactured in the United States every year, using around 15 board feet of lumber each. Wooden pallets also have an effect on the worldwide ecological system due to the insects and microorganisms that it can carry.

Pallets are widely used in industries that ship and store goods. The current pallet was designed for better time efficiency within the shipping industry. One of the most important factors in the shipping industry is time efficiency. Depending on the number of pallets that need to be moved determines the amount of time it takes to ship goods. Pallets can only be lifted in order to be moved. It is very time consuming to move one pallet at a time from place to place, especially in an industry where time is of the essence. The current pallet has reached its climax in regards to saving time in this industry.

BRIEF SUMMARY OF THE INVENTION

The interlocking pallet with wheels and braking system is made out of a metal or plastic material and improves upon the existing pallet with its multiple swivel wheels that allow it to roll in all directions. The interlocking pallet with wheels and braking system can be pushed, pulled or lifted using a fork lift, pallet jack, front loader, or other lifting machinery. The pallet's braking system locks and unlocks the pallet wheels. There are rubber insets on all four sides of the pallet allowing the fork lift to insert its forks, close its forks and grip the pallet. When the fork lift closes its forks into the rubber insets, the wheels on the pallet will automatically unlock allowing the pallet be pushed, pulled or lifted. Once the fork lift disengages from the rubber insets the wheels will automatically lock. There is a manual braking system on the pallet that locks and unlocks the wheels with the press of a button. The locking and unlocking of the wheels allow the pallet to move or stop.

The interlocking pallet with wheels and braking system is able to interlock with other like pallets on all four sides. The interlocking system joins the pallets together being able to withstand the force of pulling and pushing the pallets. The interlocking system also keeps the pallets aligned during movement, allowing the pallets to flex up and down while in motion. When pallets are interlocked the braking systems sync together allowing the pallets to move and brake as one unit.

The interlocking pallet with wheels and braking system comes in various customizable sizes, including the standard sizes: 48×90 inches and 48×45 inches. There are wheel insets on the top of each pallet that allows you the stack the pallets. The inset prevents the wheels from touching the other pallets, therefore disabling the stacked pallets from moving.

The interlocking pallet with wheels and braking system has shelf rack bars. Shelf rack bars are four metal bars that extend from the top of the pallet to create four posts on each corner of the pallet. The four shelf rack bars are collapsable, and when extended they provide a stable structure for wrapping the contents on the pallet. The four shelf rack bars also provide support for another loaded or unloaded pallet to be stacked on top of it, creating a second shelf. The pallet's shelf rack bars provide more stability and support for pallets that are loaded with goods and need to be wrapped. The second shelf that it creates when another pallet is stacked upon the four shelf rack bars, provide a space saving storage system that allows you to create shelving units as needed.

The interlocking pallet with wheels and braking system creates a more efficient time saving operation. Its' advantages to the existing pallet is the fact that it can be lifted, pushed, or pulled. It has wheels which allows the pallet to be pushed or pulled by a pallet jack, fork lift, front loader, or by hand if needed. The wheels make the pallet more mobile and easy for transport. The pallet's ability to interlock with other pallets from all four sides, allows you to move several pallets at a time versus the traditional way of moving one pallet at a time.

The interlocking pallet with wheels and braking system is only made from eco friendly materials. It last longer than wooden pallets, and is free of insects and other microorganism.

BRIEF DESCRIPTION OF DRAWINGS

FIG. 1—is a isometric top view of the pallet (B1) showing the wheel inset (A1), fork rubber (A2), holding plate (A2.2), locking ring (A3), lock/unlock wheel switch (A4), lock/unlock locking ring switch (A4.1), corner bumper (A6), load stabilizer (A11), and the shelf rack bar (C1).

FIG. 2—is an underside view of the pallet (B1) showing the wheel (A5), fork rubber (A2), locking ring (A3), and corner bumper (A6).

FIG. 3—is an isometric underside view of the pallet (B1) showing the fork rubber (A2), holding plate (A2.2), locking ring (A3), lock/unlock wheel switch (A4), lock/unlock locking ring switch (A4.1), wheel (A5), corner bumper (A6), and load stabilizer (A11).

FIG. 4—is an enlarged view of the fork rubber (A2) with the fork braking rod (A2.1).

FIG. 5—is an internal side view of the pallet (B1) showing the wheel inset (A1), fork rubber (A2), fork braking rod (A2.1), locking ring (A3), locking ring ball (A3.1), lock/unlock wheel switch (A4), lock/unlock locking ring switch (A4.1), wheel (A5), corner bumper (A6), corner bumper shock (A6.1), wheel transfer rod (A8), locking ring transfer rod (A8.1), wheel transfer gear wheel (A9), locking ring transfer gear wheel (A9.1), transfer rod guide gear wheel (A9.2), gear wheel connector (A9.3), wheel braking pin (A10), wheel transfer gear wheel bearings (A10.1), wheel transfer gear wheel shaft (A10.2), wheel braking housing bearings bolts (A10.3), wheel rotating bearing (10.4), and the wheel braking housing (A10.5).

FIG. 6—is an enlarged view of the lock/unlock wheel switch (A4), and the lock/unlock locking ring switch (A4.1).

FIG. 7—is an internal top view of the pallet (B1) showing the corner bumper (A6), corner bumper shock (A6.1), transfer rod guide gear wheel (A9.2), locking ring transfer rod guide (A8.2), locking ring ball guide (A7.1), locking ring ball engaging rod (A7), locking ring ball pusher (A7.2), locking ring ball (A3.1), and locking ring (A3).

FIG. 7A—is an enlarged internal top view of the corner bumper (A6) and corner bumper shock (A6.1).

FIG. 8—is an enlarged peripheral view of the locking ring (A3), and locking ring ball (A3.1) on the perimeter of the pallet (B1).

FIG. 9—is an isometric top view of the pallet (B1), wheel inset (A1), fork rubber (A2), holding plate (A2.2), locking ring (A3), lock/unlock wheel switch (A4), lock/unlock locking ring switch (A4.1), corner bumper (A6), load stabilizer (A11), an extended shelf rack bar (C1), and shelf rack bar inset (C2).

FIG. 10—is an enlarged internal side view of the corner of the pallet showing the locking ring (A3), locking ring ball (A3.1) corner bumper (A6), corner bumper shock (A6.1), load stabilizer (A11), load stabilizer spring (A11.1), load stabilizer pin (A11.2), an extended shelf rack bar (C1), and shelf rack bar inset (C2).

FIG. 11—is a top view of two pallets (B1) interlocked together by the locking rings (A3), and locking ring balls (A3.1). The wheel inset (A1) and corner bumper (A6) are also shown.

FIG. 12—is an internal top view of the pallet (B1) showing the wheel inset (A1), lock/unlock locking ring switch (A4.1), locking ring transfer rod (A8.1), and locking ring transfer gear wheel (A9.1).

FIG. 13—is an enlarged top view of the wheel transfer gear wheel (A9), wheel braking pin (A10), and the wheel transfer rods (A8).

FIG. 13A—There is an enlarged internal side view of the wheel transfer gear wheel (A9), wheel transfer rod (A8), wheel braking pin (A10), wheel transfer gear wheel bearing (A10.1), wheel braking housing bearings bolts (A10.3), and the wheel transfer gear wheel shaft (A10.2).

FIG. 14—is an enlarged internal front view of the wheel braking pin (A10), wheel transfer gear wheel shaft (A10.2), wheel braking housing bearings bolt (A10.3), wheel rotating bearing (A10.4), wheel braking housing (A10.5), wheel braking pin springs (A10.6), wheel connector (A10.7), and the wheel (A5).

FIG. 14A—is an enlarged view of the wheel (A5), wheel spokes (A5.1), and wheel connector (A10.7).

FIG. 15—is an enlarged isometric side view of the wheel (A5), wheel spokes (A5.1), wheel braking pin (A10), wheel braking housing (A10.5), wheel braking pin springs (A10.6), and the wheel connector (A10.7)

DETAILED DESCRIPTION OF THE INVENTION

Figure 19:
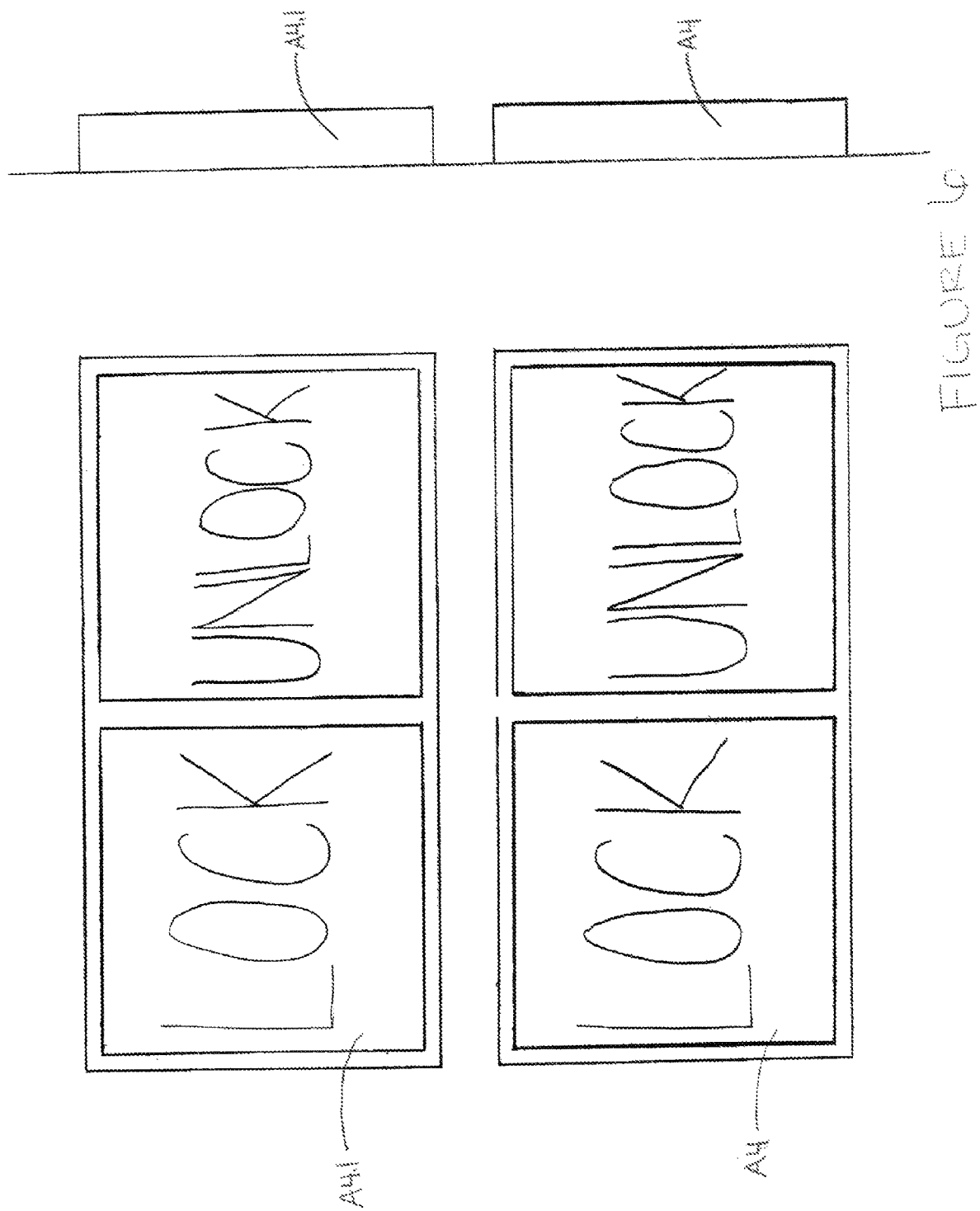

Referring to FIG. 1, the mainframe of the pallet (B1) is made out of aluminum or plastic. There are five wheel insets (A1) on the top surface of the pallet. When pallets are stacked, the wheel insets (A1) prevent the pallet wheels from setting directly on the top surface of the pallet underneath, preventing the pallets from moving when stacked. There are five sets of wheels (A5) underneath the pallet, best seen in FIGS. 2 and 3. Each set of wheels (A5) are connected by the wheel connector (A10.7), best seen in FIG. 14. Each wheel has wheel spokes (A5.1), best seen in FIG. 14A.

Referring to FIG. 3, the fork rubber (A2) is centered on all four sides of the pallet. The fork rubber (A2) is a rubber inset that allows the forklift forks to squeeze into the rubber, unlocking the pallet wheels (A5). The fork rubber (A2) can be squeezed from any side of the pallet to unlock the wheels (A5), it will also unlock the wheels of any interlocked pallets. This allows the forklift to be able to push or pull the pallet. The pallet can also be lifted by inserting the forklift forks into the fork rubber (A2) and lifting. There is an enlarged view of the fork rubber (A2), best seen in FIG. 4. When the fork rubber is squeezed, the fork braking rod (A2.1) moves inward, moving the wheel transfer rod (A8), right and left, best seen in FIG. 5, rotating the wheel transfer gear wheel (A9) which pulls up the wheel braking pin (A10). The transfer gear wheel bearing (A10.1) aids the wheel transfer gear wheel (A9) to rotate smoothly when pulling up the wheel braking pin (A10). This entire motion is stabilized by the wheel transfer gear wheel shaft (A10.2). As the wheel braking pin (A10) pulls up, best seen in FIG. 14, through the wheel braking housing (A10.5), it releases the wheel braking pin spring (A10.6) from inside the wheel spokes (A5.1), best seen in FIG. 14A, which unlocks the wheel (A5) allowing the pallet to be pushed or pulled. The wheel rotating bearing (A10.4), best seen in FIG. 14, allows the pallet wheel (A5) to move three hundred and sixty degrees. The wheel rotating bearing (A10.4) is connected to the pallet by the wheel braking housing bearing bolt (A10.3).

Referring back to FIG. 5, when the forklift forks release the fork rubber (A2) the fork braking rod (A2.1) moves outward into its original position, moving the wheel transfer rod (A8) left and right, rotating the wheel transfer gear wheel (A9) which turns the wheel braking pin (A10) downward. The transfer gear wheel bearing (A10.1) aids the wheel transfer gear wheel (A9) to rotate smoothly when turning the wheel braking pin (A10) downward. This entire motion is stabilized by the wheel transfer gear wheel shaft (A10.2). As the wheel braking pin (A10) turns downward, best seen in FIG. 15, through the wheel braking housing (A10.5), it pushes the wheel braking pin springs (A10.6) outward into the wheel spokes (A5.1), locking the wheel (A5) and stopping the pallet from moving.

Referring back to FIG. 1, there is a holding plate (A2.2) that mounts in front of the fork rubber (A2) on all four sides of the pallet. The holding plate (A2.2) holds the fork rubber (A2) in place and is able to be removed when fork rubber (A2) wears and needs to be replaced. There are two switches on each side of each corner of the pallet, the lock/unlock wheel switch (A4) and the lock/unlock locking ring switch (A4.1). When either switch is pressed in the lock or unlock position, it activates its corresponding switches around the pallet. It will also activate the corresponding switches of any interlocked pallets. Referring to the two switches on each side of each corner of the pallet, best seen in FIG. 6, the lock/unlock wheel switch (A4) locks or unlocks the pallet wheels manually. When the lock/unlock wheel switch (A4) is pushed into the unlock position it moves the wheel transfer rod (A8) right and left, best seen in FIG. 13, rotating the wheel transfer gear wheel (A9) which pulls up the wheel braking pin (A10). The transfer gear wheel bearing (A10.1), best seen in FIG. 13A, aids the wheel transfer gear wheel (A9) to rotate smoothly when pulling up the wheel braking pin (A10). This entire motion is stabilized by the wheel transfer gear wheel shaft (A10.2). As the wheel braking pin (A10) pulls up, best seen in FIG. 14, through the wheel braking housing (A10.5), it releases the wheel braking pin spring (A10.6) from inside the wheel spokes (A5.1), best seen in FIG. 14A, which unlocks the wheel (A5) allowing the pallet to be pushed or pulled.

Referring back to FIG. 6, when the lock/unlock wheel switch (A4) is pushed into the lock position it moves the wheel transfer rod (A8) left and right, best seen in FIG. 13, rotating the wheel transfer gear wheel (A9) which turns the wheel braking pin (A10) downward. The transfer gear wheel bearing (A10.1), best seen in FIG. 13A, aids the wheel transfer gear wheel (A9) to rotate smoothly when turning the wheel braking pin (A10) downward. This entire motion is stabilized by the wheel transfer gear wheel shaft (A10.2). As the wheel braking pin (A10) turns downward, best seen in FIG. 15, through the wheel braking housing (A10.5), it pushes the wheel braking pin springs (A10.6) outward into the wheel spokes (A5.1), locking the wheel (A5) and stopping the pallet from moving.

Referring back to FIG. 6, the lock/unlock locking ring switch (A4.1) locks and unlocks the locking rings (A3), best seen in FIG. 11, allowing two pallets to interlock together. When interlocking two pallets, the two pallets are pushed together, sliding the locking rings (A3) into each other's grooves. When the lock/unlock locking ring switch (A4.1), best seen in FIG. 5, is pushed to the lock position it rotates the locking ring transfer gear wheel (A9.1), sliding the locking ring transfer rod (A8.1) left and right, turning the gear wheel connector (A9.3) and rotating the transfer rod guide gear wheel (A9.2). When the transfer rod guide gear wheel (A9.2) rotates, best seen in FIG. 7, sliding the locking ring transfer rod guide (A8.2) left and right, triggering the locking ring ball guide (A7.1) and the locking ring ball engaging rod (A7) to slide left simultaneously. The locking ring ball engaging rod (A7) pushes the locking ring ball pusher (A7.2) into the locking ring ball (A3.1). The locking ring ball (A3.1) protrudes out, best seen in FIG. 10, and into the next locking ring (A3), interlocking two pallets together. There is a locking ring ball (A3.1) in every third locking ring (A3) around the perimeter of the pallet. Pallets can be interlocked from all four sides.

Referring back to FIG. 6, when the lock/unlock locking ring switch (A4.1) is pushed to the unlock position it rotates the locking ring transfer gear wheel (A9.1), best seen in FIG. 5, sliding the locking ring transfer rod (A8.1) right and left, turning the gear wheel connector (A9.3) and rotating the transfer rod guide gear wheel (A9.2). When the transfer rod guide gear wheel (A9.2) rotates, best seen in FIG. 7, sliding the locking ring transfer rod guide (A8.2) right and left, triggering the locking ring ball guide (A7.1) and the locking ring ball engaging rod (A7) to slide right simultaneously. The locking ring ball engaging rod (A7) pulls back the locking ring ball pusher (A7.2) releasing the locking ring ball (A3.1), and unlocking the locking rings (A3) of two interlocked pallets.

Referring back to FIG. 1, there is a corner bumper (A6) on each side of the pallet that protects the locking rings (A3) from damage. The corner bumper (A6) has a corner bumper shock (A6.1), best seen in FIG. 7A, that absorbs the impact. The corner bumper shock (A6.1) also allows the corner bumper (A6) to push in when two pallets are pushed together to interlock, best seen in FIG. 11.

Referring back to FIG. 1, there are two load stabilizers (A11) on each side of the pallet. The load stabilizer (A11) extends, best seen in FIG. 10, by being pulled up and over the load stabilizer pin (A11.2). The load stabilizer spring (A11.1) keeps the extended load stabilizer (A11) in position. The load stabilizer (A11) makes up the difference in space between the pallet and walls of the shipping vehicle. It helps prevent the pallet from shifting when in a moving shipping vehicle. When the load stabilizer (A11) is no longer needed, it is pulled up and back over the load stabilizer pin (A11.2).

Referring back to FIG. 1, there are four shelf rack bars (C1) on the top perimeter of the pallet. The shelf rack bars (C1) can be extended, best seen in FIG. 9, to provide additional support for the items and goods that are loaded onto the pallet. When not in use, the shelf rack bar (C1) lays flush within the shelf rack bar inset (C2) around the top perimeter of the pallet, as seen in FIG. 1.

Fulfillment centers, distribution centers, warehouses, storage facilities, shipment preparation centers, processing facilities and other like facilities are purposed for receiving, storing and distributing items and goods. These items and goods are packed onto pallets preparing to be shipped and transported to their desired destination. Once the pallets are loaded they can be pushed together by hand, pallet jack, or forklift and interlocked by pressing the lock/unlock locking ring switch (A4.1). The pallet wheels makes the pallet able to move in any direction. The pallets have a corner bumper (A6) with a corner bumper shock (A6.1) that absorbs any corner impact the pallet may encounter while at the facilities and/or during the loading and unloading into shipping vehicles.

The fulfillment centers, distribution centers, warehouses, storage facilities, shipment preparation centers, processing facilities and other like facilities are equipped with loading docks, loading bays, or other similar provisions. Shipping vehicles including trucks, vans, trailers, aircraft, ships, railway cars and other like terms are backed up to the loading dock or loading bay for the purpose of loading multiple pallets into the vehicle. Depending on the size of the shipping vehicle, the load stabilizers (A11) can be pulled out on the perimeter of the interlocked pallets to create a snug fit in the shipping vehicle if necessary. Once the shipping vehicle is ready to be loaded the forklift driver inserts the forklift forks into the fork rubber (A2) of the pallet and squeezes the fork rubber (A2), unlocking the brakes on all the interlocked pallets, enabling the forklift driver to push the loaded interlocked pallets into the shipping vehicle all at once versus picking up one pallet at a time and putting it into the shipping vehicle.

When the fulfillment centers, distribution centers, warehouses, storage facilities, shipment preparation centers, processing facilities and other like facilities receive inbound shipments, the shipping vehicles including trucks, vans, trailers, aircraft, ships, railway cars and other like terms are backed up to the loading dock or loading bay for the purpose of unloading multiple pallets into the facility. When unloading the shipping vehicle, the forklift driver will insert the forklift forks into the fork rubber (A2) of the front pallet and squeeze the fork rubber (A2), unlocking the brakes on all the interlocked pallets, enabling the forklift driver to pull the loaded interlocked pallets out of the shipping vehicle all at once. If the entire truck of interlocked pallets is not destined for the same location, the forklift driver can pull the interlocked pallets out of the shipping vehicle as far as needed, unlock them at that point by pressing the lock/unlock locking ring switch (A4.1), and then taking the needed interlocked pallets into the facility leaving the other loaded pallets in the shipping vehicle.

The shelf rack bars (C1) on the pallet can be used for additional stabilization for the items and goods packed on the pallet and/or to create a shelving unit in fulfillment centers, distribution centers, warehouses, storage facilities, shipment preparation centers, processing facilities and other like facilities. When pallets are loaded with the shelf rack bars (C1) extended, they provide additional support for the items and goods that are loaded onto the pallet. The shelf rack bars (C1) can be used as post for wrapping plastic, ropes, straps or other materials around the load on the pallet, additionally securing the load.

Once the load is secured and the pallets are interlocked if need be, the forklift driver inserts the forklift forks into the fork rubber (A2) of the pallet and squeezes the fork rubber (A2), unlocking the brakes on all the interlocked pallets, enabling the forklift driver to push the loaded interlocked pallets into the shipping vehicle at the loading dock or loading bay. When the fulfillment centers, distribution centers, warehouses, storage facilities, shipment preparation centers, processing facilities and other like facilities receive inbound shipments where the pallets have the shelf rack bars (C1) extended, the forklift driver can unload the shipping vehicle the same way. The forklift driver will insert the forklift forks into the fork rubber (A2) of the front pallet and squeeze the fork rubber (A2), unlocking the brakes on all the interlocked pallets, enabling the forklift driver to pull the loaded interlocked pallets out of the shipping vehicle all at once. The pallets with the shelf rack bars (C1) extended can also be used as a shelving unit. Pallets with the shelf rack bars (C1) extended can have another pallet stacked on top of it, creating a second shelf for storage.

Fulfillment centers, distribution centers, warehouses, storage facilities, shipment preparation centers, processing facilities and other like facilities can easily store empty pallets by stacking them on top of each other. When stacked the pallet wheels (A5) sit into the wheel insets (A1) on top of each pallet, preventing the pallets from moving.

The invention claimed is:

1. A pallet, comprising of wheels underneath, a braking system within the wheel and wheel housing which are connected, and a manual device system on all four sides of the pallet; wherein said wheels allow the pallet to move in all directions, and said braking system is configured to slow and stop the wheels on the pallet simultaneously, and said braking system can be manually engaged by a button or switch located in said manual device system.

2. A pallet according to claim 1 further comprising a forklift access system; wherein said forklift access system located on all four sides of said pallet comprise fork rubber insets that when squeezed by forklift engages said braking system and allows a forklift to, push and pull the pallet.

3. A pallet according to claim 1 further comprising an interlocking connection system; wherein said interlocking connection system located on all four sides of said pallet, interlocks and connects multiple said pallets when pushed together.

4. A pallet according to claim 3; wherein said interlocking connection system can be manually engaged by a button or switch located in said manual device system, and said interlocked pallets engages the corresponding buttons or switches within the manual device system on each pallet, synchronizing said braking systems and interlocking connection systems.

5. A pallet according to claim 4; wherein said synchronized braking systems can be operated by said forklift when said fork rubber insets are squeezed on interlocked pallets, allowing interlocked pallets to be pushed or pulled by said forklift.

6. A pallet according to claim 1, further comprising a corner bumper; wherein said corner bumpers located on all four sides of said pallet, protects the pallet from damage.

7. A pallet according to claim 1, further comprising a load stabilizer; wherein said load stabilizer located on all four sides of said pallet, helps to prevent pallet from moving or shifting during transit.

8. A pallet according to claim 1, further comprising shelf rack bars; wherein said shelf rack bars located on the perimeter of said pallet, when installed or extended helps stabilize stacked goods on the pallet, and allows additional loaded or unloaded said pallets to stack on top of said shelf rack bars.

9. A pallet according to claim 1, further comprising wheel insets, wherein said wheel insets located on top surface of said pallet, prevents wheels from moving when pallets are stacked on top of each other.

* * * * *